US012589753B2

(12) United States Patent
Uttam

(10) Patent No.: US 12,589,753 B2
(45) Date of Patent: Mar. 31, 2026

(54) PROTECTED IDLE SYSTEM FOR A VEHICLE

(71) Applicant: GM Global Technology Operations LLC, Detroit, MI (US)

(72) Inventor: Rohit Uttam, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 18/507,317

(22) Filed: Nov. 13, 2023

(65) Prior Publication Data

US 2025/0153722 A1 May 15, 2025

(51) Int. Cl.
| | |
|---|---|
| *B60W 50/00* | (2006.01) |
| *B60W 50/08* | (2020.01) |
| *B60W 50/10* | (2012.01) |
| *B60W 50/12* | (2012.01) |

(52) U.S. Cl.
CPC ...... *B60W 50/0098* (2013.01); *B60W 50/087* (2013.01); *B60W 50/10* (2013.01); *B60W 50/12* (2013.01); *B60W 2510/18* (2013.01)

(58) Field of Classification Search
CPC .......... B60W 50/0098; B60W 50/087; B60W 50/10; B60W 50/12; B60W 2510/18; B60R 25/00; F02N 11/0833; F02N 2200/0802; F02N 2200/102; F02N 2200/106; F02N 2300/2011; F02N 11/0822
See application file for complete search history.

(56) References Cited

U.S. PATENT DOCUMENTS

| | | | | | |
|---|---|---|---|---|---|
| 9,388,750 | B2 * | 7/2016 | Be | ............ | F02D 29/02 |
| 9,471,124 | B2 * | 10/2016 | Lo | ............ | G06F 1/266 |
| 9,714,706 | B1 * | 7/2017 | Szawarski | .......... | F16H 63/3458 |
| 2009/0234563 | A1 * | 9/2009 | Pfohl | ........... | F02D 41/0205 |
| | | | | | 701/112 |
| 2009/0319161 | A1 * | 12/2009 | Abendroth | .......... | F02N 11/0818 |
| | | | | | 701/112 |

(Continued)

FOREIGN PATENT DOCUMENTS

| | | | | | |
|---|---|---|---|---|---|
| CN | 115027473 | A | * | 9/2022 | ............ B60W 10/10 |
| DE | 102009048262 | A1 | * | 4/2011 | .......... F02N 11/0818 |

(Continued)

OTHER PUBLICATIONS

DE_102009048262_A1_I_translation (Year: 2011).*

(Continued)

*Primary Examiner* — Kyle T Johnson
(74) *Attorney, Agent, or Firm* — Honigman LLP; Matthew H. Szalach; Jonathan P. O'Brien

(57) ABSTRACT
A computer-implemented method when executed by data processing hardware causes the data processing hardware to perform operations. The operations include detecting a park mode of a vehicle equipped with an automatic protected idle function and activating the automatic protected idle function automatically in response to the detected park mode. A state of a control switch associated with the automatic protected idle function is determined, and a hold time is set in response to a respective determined state of the control switch. The operations also include modifying the automatic protected idle function for one or more ignition cycles in response to the set hold time.

20 Claims, 7 Drawing Sheets

(56)     References Cited

U.S. PATENT DOCUMENTS

| | | | | |
|---|---|---|---|---|
| 2010/0100306 A1* | 4/2010 | Gamache | F02N 11/0803 | |
| | | | 701/113 | |
| 2011/0238284 A1* | 9/2011 | Bollig | B60W 30/192 | |
| | | | 701/113 | |
| 2012/0035817 A1* | 2/2012 | Waku | B60W 10/06 | |
| | | | 701/54 | |
| 2014/0297165 A1* | 10/2014 | Matsunaga | F02D 29/02 | |
| | | | 701/112 | |
| 2015/0142265 A1* | 5/2015 | Killy | B60W 10/06 | |
| | | | 701/41 | |
| 2018/0045162 A1* | 2/2018 | Enomoto | F02N 11/0818 | |
| 2018/0374289 A1* | 12/2018 | Huntzicker | B60R 25/042 | |
| 2019/0264645 A1* | 8/2019 | Siddiqui | F02N 11/0822 | |
| 2019/0309721 A1* | 10/2019 | Siddiqui | F02N 11/0833 | |
| 2020/0164878 A1* | 5/2020 | Orantes | B60W 30/18018 | |
| 2021/0039645 A1* | 2/2021 | Hoshi | B60W 30/18018 | |
| 2022/0025839 A1* | 1/2022 | Ekelund | F02N 11/0833 | |
| 2025/0153722 A1* | 5/2025 | Uttam | F02N 11/0822 | |

FOREIGN PATENT DOCUMENTS

| | | | | | |
|---|---|---|---|---|---|
| DE | 102010061832 A1 | * | 5/2012 | .......... | F02N 11/0822 |
| DE | 102012215473 A1 | | 3/2013 | | |
| DE | 102015207544 A1 | | 10/2015 | | |
| DE | 102018114887 A1 | | 12/2018 | | |
| DE | 102018115544 A1 | | 1/2019 | | |
| GB | 2332286 A | * | 6/1999 | ........... | B60W 10/06 |
| KR | 20110050344 A | * | 5/2011 | .......... | F02D 41/042 |
| TW | I461602 B | * | 11/2014 | | |

OTHER PUBLICATIONS

KR_20110050344_A_I_translation (Year: 2011).*

DE_102010061832_A1_I_translation (Year: 2012).*

TW_I461602_B_I_translation (Year: 2014).*

CN_115027473_A_I_translation (Year: 2022).*

* cited by examiner

Electronic Control Unit (ECU) 102

Automatic Protected Idle Function 12

PROTECTED IDLE SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a protected idle system for a vehicle.

Emergency or other first responder vehicles are often equipped with a standby or idle mode. The idle mode allows a responder to exit the vehicle while leaving the engine running. The idle mode is typically equipped with a lock function that prevents a third party from accessing or otherwise maneuvering the vehicle while in the idle function. The responder typically has to manually activate the idle function before exiting the vehicle. The activation of the idle function is done each time the idle function is utilized, regardless of whether the idle function has been activated during a single operation of the vehicle. The responder may find the repeated activation of the idle function cumbersome, especially when responding to a high-stress scenario. Thus, an automated function would be advantageous to improve operation of the vehicle for the responder.

SUMMARY

In some aspects, a computer-implemented method when executed by data processing hardware causes the data processing hardware to perform operations. The operations include detecting a park mode of a vehicle equipped with an automatic protected idle function and activating the automatic protected idle function automatically in response to the detected park mode. A state of a brake of the vehicle is determined in response to the activated protected idle function, and a state of a control switch associated with the automatic protected idle function is determined. The operations then include setting a hold time in response to the respective determined state of the brake and the control switch and disabling the automatic protected idle function for one or more ignition cycles in response to the set hold time.

In some examples, setting the hold time may include setting a first hold time, a second hold time, and a third hold time. Each hold time may be associated with a pressed state of the control switch. Optionally, disabling the automatic protected idle function for one or more ignition cycles may include pressing the control switch for one of the first hold time and the second hold time and disabling an active ignition cycle of the one or more ignition cycles. In other configurations, disabling the automatic protected idle function for the one or more ignition cycles may include pressing the control switch for the second hold time and disabling the automatic protected idle function for the active ignition cycle and each future ignition cycle of the one or more ignition cycles. The operations may, in some examples, include pressing the control switch for the third hold time and re-enabling the automatic protected idle function for each of the future ignition cycles in response to the control switch being in the pressed state for the third hold time.

In other examples, the step of disabling the automatic protected idle function for the one or more ignition cycles may include pressing the control switch for the first hold time and disabling the automatic protected idle function for a single ignition cycle corresponding to the active ignition cycle. Optionally, the operations may include detecting an ignition-off mode of the vehicle and re-enabling the automatic protected idle function for future ignition cycles in response to the detected ignition-off mode.

In other aspects, a computer-implemented method when executed by data processing hardware causes the data processing hardware to perform operations. The operations include detecting a park mode of a vehicle equipped with an automatic protected idle function and activating the automatic protected idle function automatically in response to the detected park mode. A state of a control switch associated with the automatic protected idle function is determined, and a hold time is set in response to a respective determined state of the control switch. The operations also include modifying the automatic protected idle function for one or more ignition cycles in response to the set hold time.

In some examples, the operations may include setting a first hold time, a second hold time, and a third hold time, each hold time associated with a pressed state of the control switch. Optionally, modifying the automatic protected idle function for one or more ignition cycles may include pressing the control switch for one of the first hold time and second hold time and disabling an active ignition cycle of the one or more ignition cycles. The automatic protected idle function for the one or more ignition cycles may be modified by pressing the control switch for the second hold time, and the automatic protected idle function may be disabled for the active ignition cycle and each future ignition cycle of the one or more ignition cycles. The operations may include pressing the control switch for the third hold time and re-enabling the automatic protected idle function for each of the future ignition cycles in response to the control switch being in the pressed state for the third hold time. In other examples, the automatic protected idle function for the one or more ignition cycles may be modified by pressing the control switch for the first hold time and disabling the automatic protected idle function for a single ignition cycle corresponding to the active ignition cycle. The operations may also include detecting an ignition-off mode of the vehicle and re-enabling the automatic protected idle function for future ignition cycles in response to the detected ignition-off mode.

In yet other aspects, a protected idle system for a vehicle includes an ignition of the vehicle including one or more ignition cycles and a control switch operable between a released state and a pressed state. The protected idle system also includes an electronic control unit (ECU) that is communicatively coupled with each of the ignition and the control switch. The ECU includes data processing hardware that is configured to automatically activate an automatic protected idle function. The automatic protected idle function is configured with a first hold time and a second hold time, and the ECU is configured to disable the automatic protected idle function for at least one of the one or more ignition cycles in response to the pressed state of the control switch corresponding to at least one of the first hold time and the second hold time.

In some examples, the ignition of the vehicle may include an ignition-on mode and an ignition-off mode, and the one or more ignition cycles may include an active ignition cycle and future ignition cycles. The protected idle system may also include an authorized user device. The ECU may be configured to re-enable the automatic protected idle function in response to the ignition-off mode of the ignition and detection of the authorized user device. In some configurations, the automatic protected idle function may include a third hold time, and the ECU may be configured to re-enable the automatic protected idle function for the active ignition cycle and each of the future ignition cycles in response to the control switch being in the pressed state for the third hold time.

In further examples, the protected idle system may include a brake that may be operable between a pressed state and a released state. The ECU may be configured to disable the automatic protected idle function for the active ignition cycle and each of the future ignition cycles in response to the pressed state of the control switch corresponding to the second hold time and in response to the pressed state of the brake. Optionally, the ECU may be configured to lock the ignition into a park mode of the vehicle in response to activation of the automatic protected idle function.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
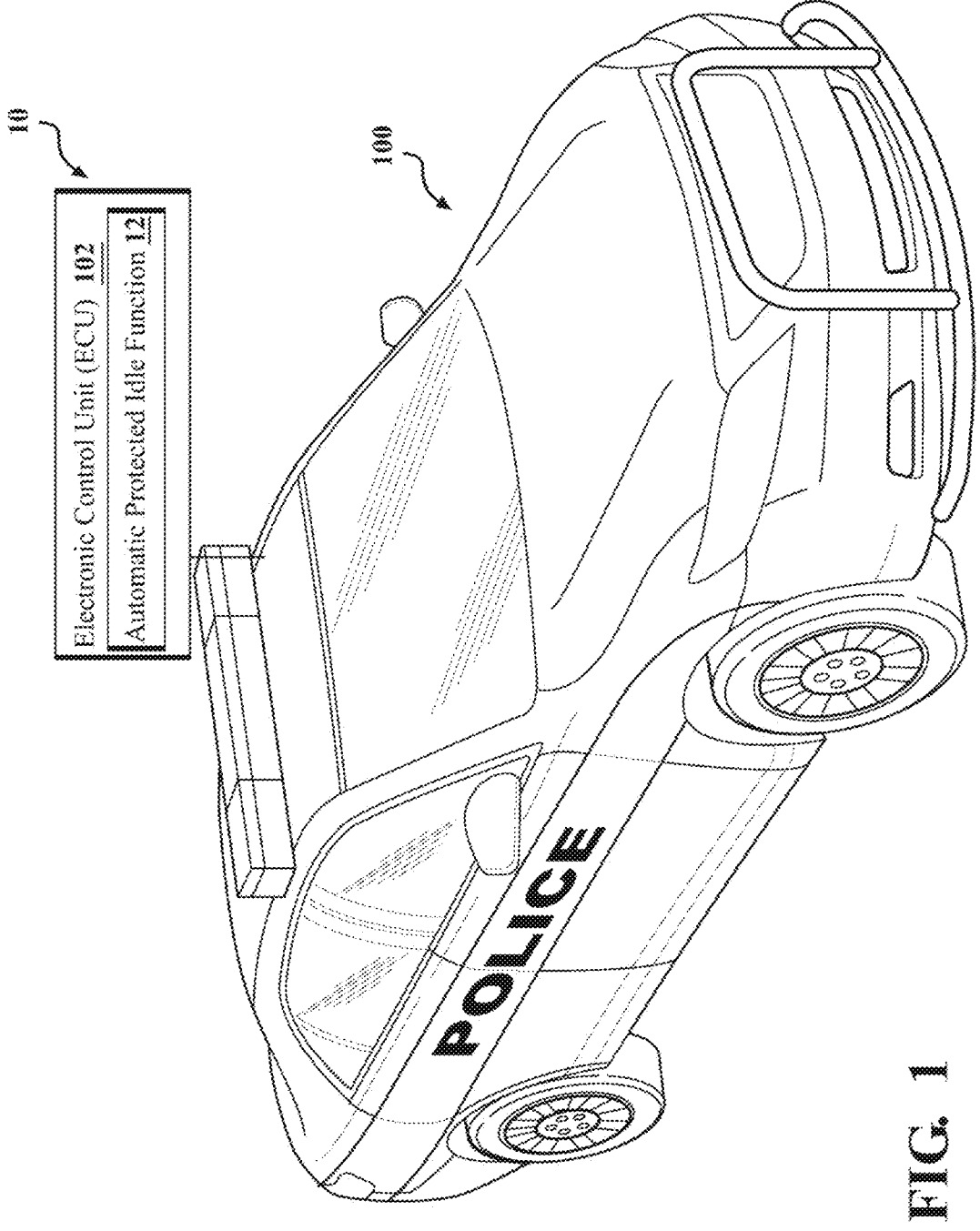
FIG. 1 is a perspective view of a vehicle equipped with a protected idle system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
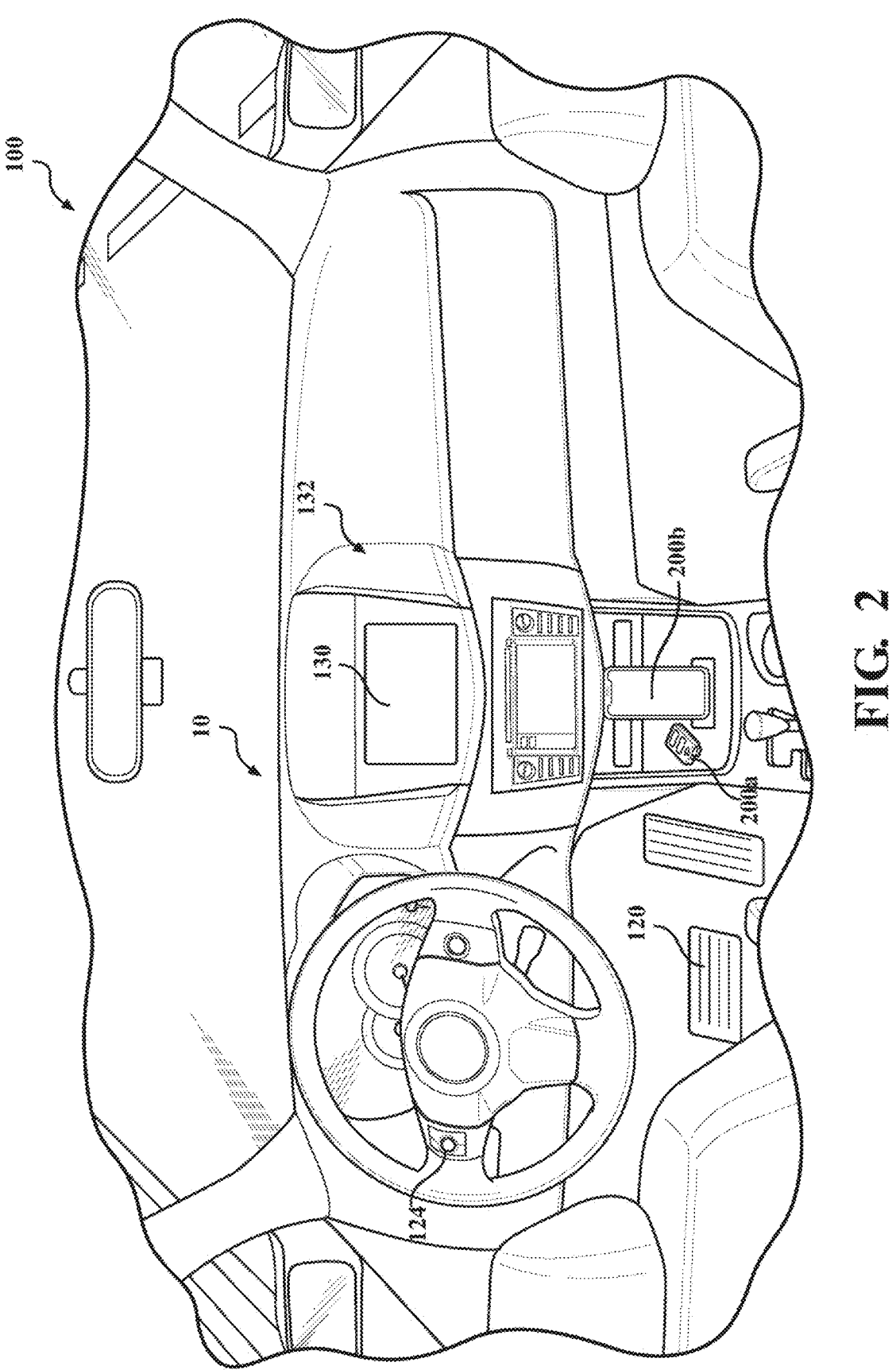
FIG. 2 is an enlarged, partial perspective view of an interior of a vehicle according to the present disclosure with an authorized user device.
Figure 3:
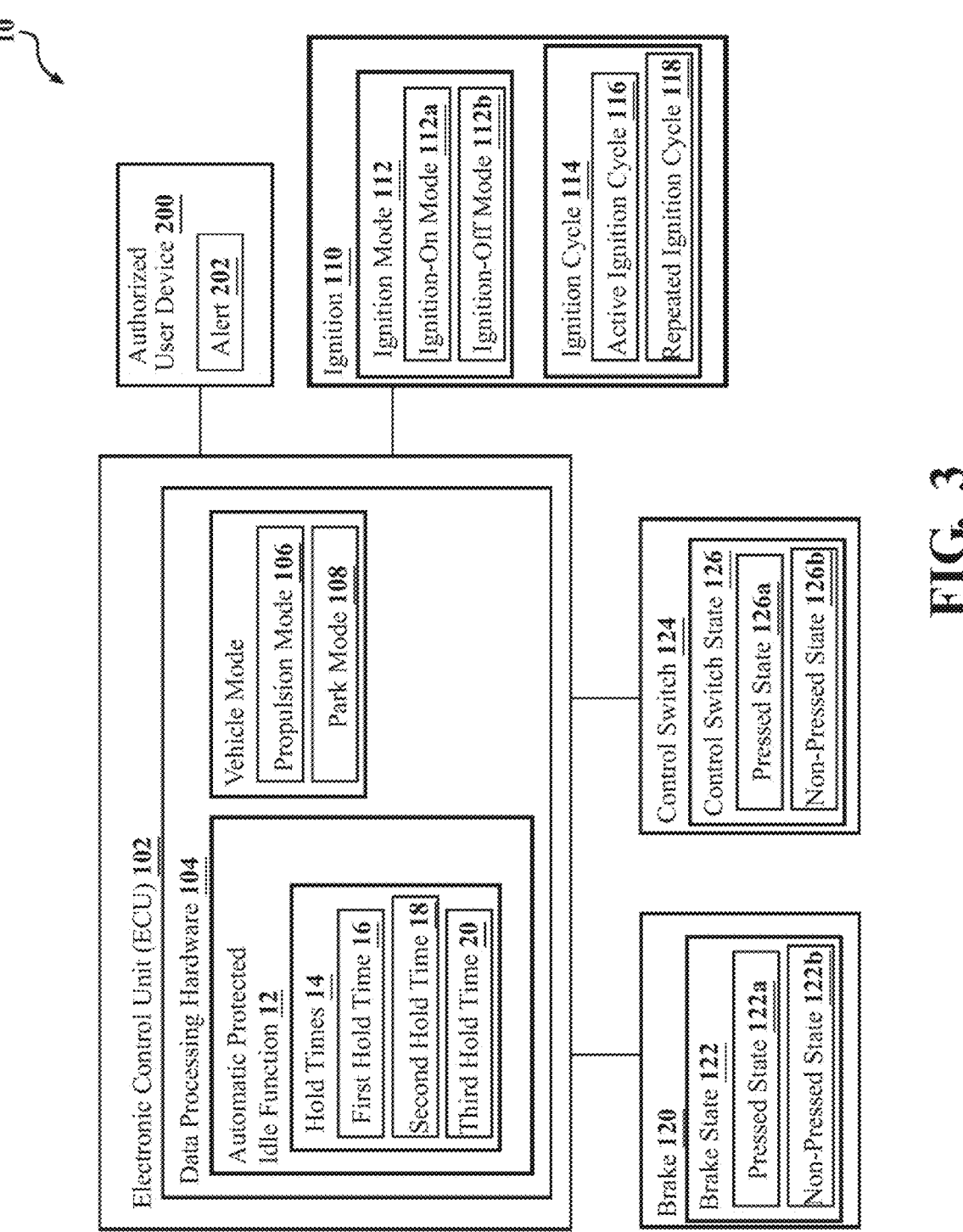
FIG. 3 is an example box diagram of a protected idle system according to the present disclosure.
Figure 4:
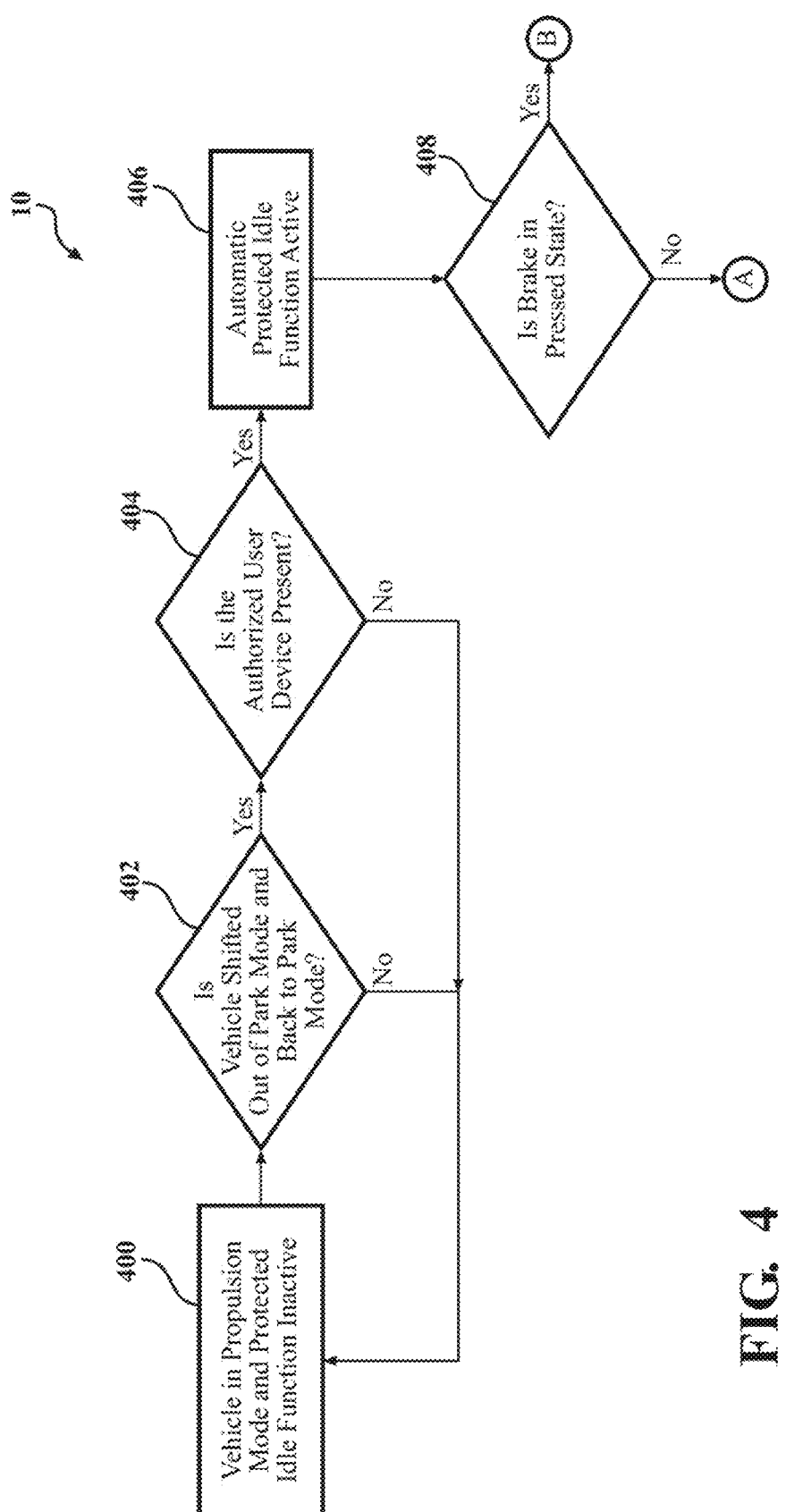
FIG. 4 is an example flow diagram for a protected idle system according to the present disclosure.
Figure 5:
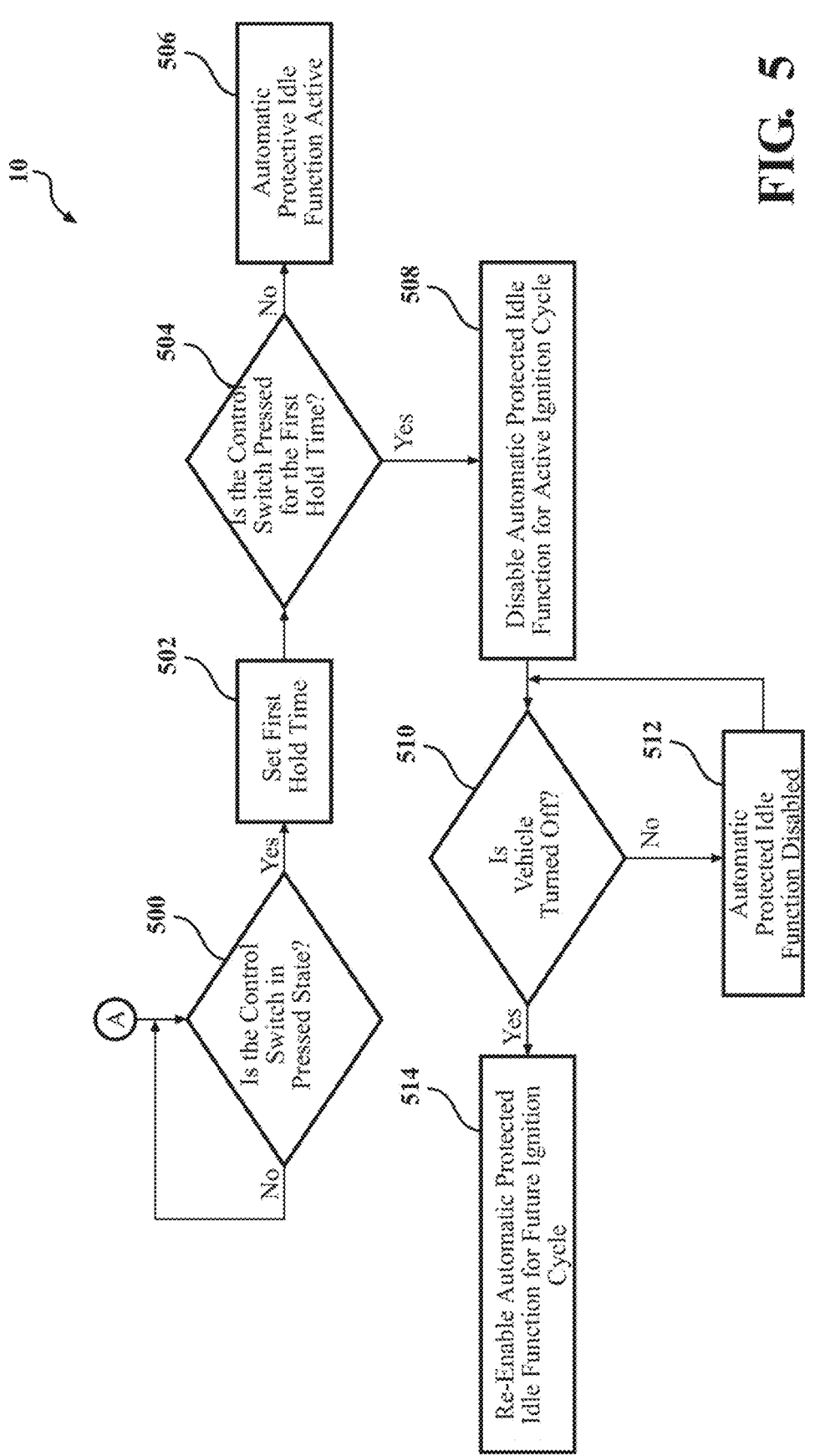
FIG. 5 is a continued example flow diagram for the protected idle system of FIG. 4.
Figure 6:
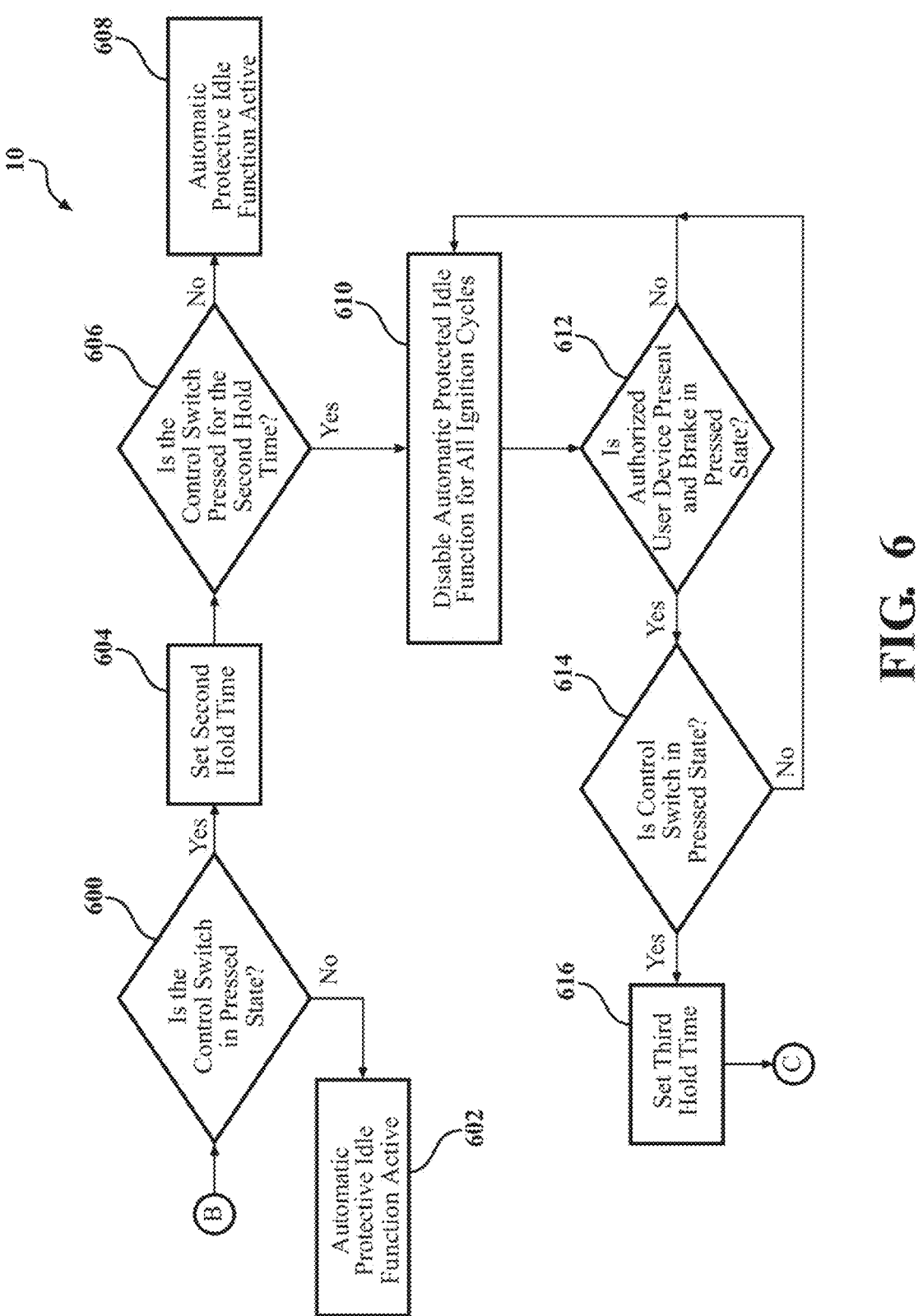
FIG. 6 is a further example flow diagram for the protected idle system of FIG. 4.
Figure 7:
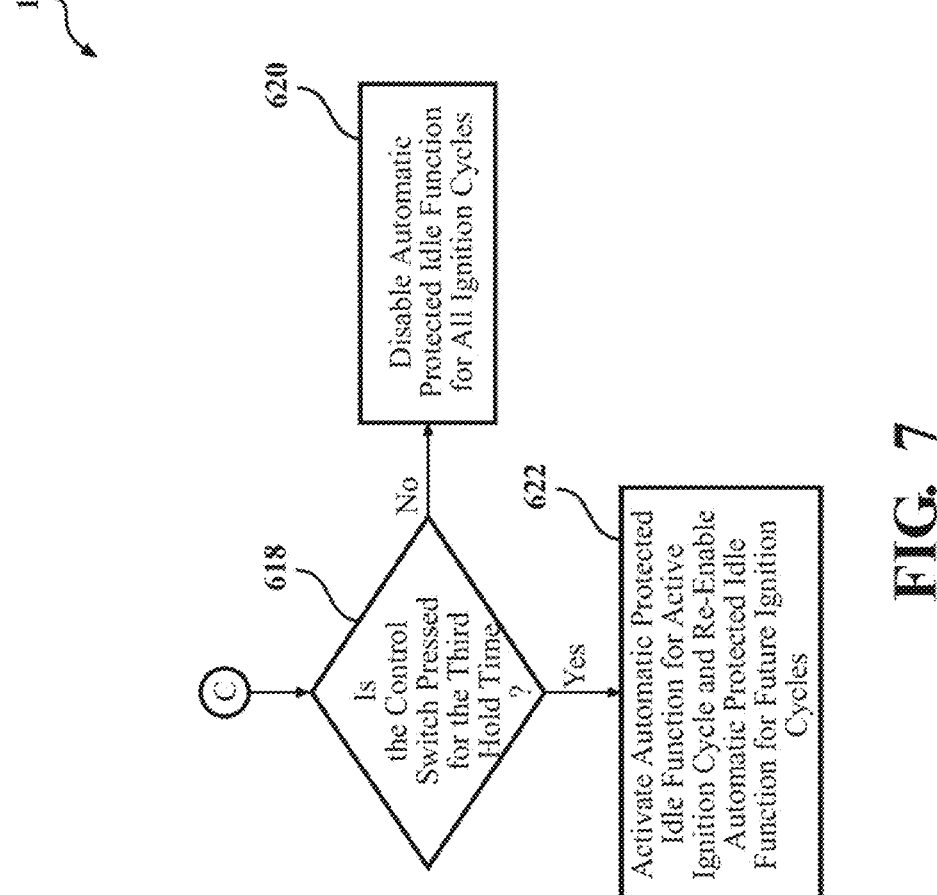
FIG. 7 is a continued example flow diagram for the protected idle system of FIG. 6.

Referring to FIGS. 1-3, a vehicle 100 includes an electronic communication unit (ECU) 102 that is configured as part of a protected idle system 10 for the vehicle 100. The ECU 102 includes data processing hardware 104 that is configured with an automatic protected idle function 12 of the protected idle system 10, described in more detail herein. The protected idle system 10 is configured to prevent execution of a propulsion mode 106 of the vehicle 100 from a park mode 108 of the vehicle 100.

The vehicle 100 includes an ignition 110 that executes a respective mode of the vehicle 100, including the propulsion mode 106 and the park mode 108. The ignition 110 includes an ignition mode 112 that is generally binary between an ignition-on mode 112a and an ignition-off mode 112b. The ignition-off mode 112b may reset or otherwise recalibrate the automatic protected idle function 12 of the protected idle system 10, as described herein. Additionally or alternatively, the automatic protected idle function 12 may be unaffected by the ignition mode 112, described in more detail below. The ignition 110 may also include one or more ignition cycles 114. Each of the ignition modes 112 and the ignition cycles 114 are communicated with the ECU 102 and utilized as part of the protected idle system 10. The ignition cycles 114 include an active ignition cycle 116 and future ignition cycles 118. The active ignition cycle 116 is generally defined by the ignition-on mode 112a, which may include both the propulsion mode 106 and the park mode 108 of the vehicle 100. The future ignition cycles 118 are defined as ignition cycles occurring after the active ignition cycle 116. For example, the future ignition cycles 118 may be defined as ignition cycles 114 occurring after the ignition-off mode 112b. Each of the ignition cycles 114 are described in more detail below with respect to the ignition modes 112 and the automatic protected idle function 12.

With further reference to FIGS. 1-3, the vehicle 100 also includes a brake 120 configured with a brake state 122 and a control switch 124 configured with a control switch state 126. Each of the brake state 122 and the control switch state 126 includes a pressed state 122a, 126a and a released state 122b, 126b, respectively. For example, the brake 120 and the control switch 124 are each operable between the pressed state 122a, 126a and the released state 122b, 126b. The ECU 102 is communicatively coupled with each of the brake 120 and the control switch 124 to determine the respective state 122, 126 of the brake 120 and the control switch 124. The state 126 of the control switch 124 is generally associated with the automatic protected idle function 12, such that the pressed state 126a of the control switch 124 may disable the automatic protected idle function 12, as described in more detail below.

The automatic protected idle function 12 is configured with a hold time 14 that cooperates with the states 122, 126 of the brake 120 and the control switch 124, respectively. The hold time 14 includes a first hold time 16, a second hold time 18, and a third hold time 20. Each of the hold times 14 may be programmed or set by the ECU detecting a press time 22 of the control switch 124. It is contemplated that the hold times 14 may be set during an initial setup of the ECU 102, such that a user may customize the hold times 14 while maximizing efficiency for repeated use. Additionally or alternatively, the user may reconfigure the hold times 14 during each new ignition cycle 114.

While each hold time 14 corresponds to a different period of time, it is contemplated that, in some examples, the hold times 14 may correspond to a singular time period. The ECU 102 may utilize the states 122, 126 of the brake 120 and the control switch 124, respectively, to differentiate the hold times 14 and a respective associated output, described in more detail below. For example, the first hold time 16 and the second hold time 18 may be programmed for the same or similar duration of time during which the control switch 124 is in the pressed state 126a. The ECU 102 may determine whether the brake 120 is in the pressed state 122a or the released state 122b to determine whether the first hold time 16 or the second hold time 18 is being executed by the user. Additionally or alternatively, the ECU 102 may determine that the first hold time 16 is programmed with a different period of time as compared with the second hold time 18 to differentiate the two hold times 16, 18.

With further reference to FIGS. 1-3, the ECU 102 is configured to execute or otherwise activate the protected idle system 10 in response to the vehicle transitioning from the propulsion mode 106 to the park mode 108. It is contemplated that the automatic protected idle function 12 is inactive when the vehicle 100 is in the propulsion mode 106, such that the user may adjust or otherwise change modes of the ignition 110. When the user transitions the vehicle 100 into the park mode 108, the ECU 102 determines whether an authorized user device 200 is present within the vehicle 100. The authorized user device 200 may be configured as part of the protected idle system 10, such that the automatic protected idle function is automatically activated when the authorized user device 200 is present and the vehicle 100 is in the park mode 108. The authorized user device 200 may include, but is not limited to, a key fob 200a and a mobile device such as a mobile phone 200b.

The user may receive an alert 202 indicating the automatic activation of the automatic protected idle function 12. For example, the key fob 200a may vibrate, beep, and/or flash a light in a predefined pattern corresponding to the alert 202. Additionally or alternatively, the mobile device 200b may display the alert 202 on a display screen 204b, in combination with any one of vibrating, beeping, and/or flashing a light, to indicate activation of the automatic protected idle function 12 of the protected idle system 10. In some examples, the alert 202 may also be displayed on a display screen 130 of the vehicle 100.

Referring still to FIGS. 1-3 and as mentioned above, the automatic protected idle function 12 is automatically enabled as part of the ECU 102 of the vehicle 100 and is automatically activated when the vehicle 100 is in the park mode 108. During the propulsion mode 106 of the vehicle 100, the automatic protected idle function 12 is enabled, but remains inactive until the vehicle 100 is in the park mode 108. For example, if the vehicle 100 is in the park mode 108, shifted out of the park mode 108, and subsequently shifted back into the park mode 108, then the protected idle system 10 may determine whether the authorized user device 200 is present and, if so, automatically activate the enabled automatic protected idle function 12. If the vehicle 100 is shifted out of the park mode 108 and does not return to the park mode 108, then the automatic protected idle function 12 remains inactive. Additionally or alternatively, if the vehicle 100 is in the park mode 108, but the authorized user device 200 is not detected, then the automatic protected idle function 12 remains inactive.

The protected idle system 10 is thus activated in response to the vehicle 100 being in the park mode 108 and the detection of the authorized user device 200. The authorized user device 200 may be detected within the vehicle 100, such that the authorized user device 200 may be positioned proximate to a console 132 of the vehicle 100. In some examples, the vehicle 100 may be equipped with a docking station 134, which may receive the authorized user device 200 for detection by the ECU 102. In other examples, the ECU 102 may detect the authorized user device 200 within a predetermined range, such that the user may be exiting the vehicle 100 immediately following transitioning the vehicle 100 into the park mode 108.

As generally mentioned above, the automatic protected idle function 12 is configured to lock the ignition 110 and transmission of the vehicle 100 in the park mode 108 to prevent unauthorized transition of the vehicle 100 into the propulsion mode 106. The automatic protected idle function 12 is designed to advantageously maintain the ignition 110 in the ignition-on mode 112a when the vehicle 100 is in the park mode 108. Maintaining the vehicle 100 in the ignition-on mode 112a is particularly advantageous for first responders, as a responder may need to safely exit the vehicle 100 while leaving the vehicle 100 in the ignition-on mode 112a should the responder need to quickly transition the vehicle 100 to the propulsion mode 106. Thus, the automatic activation of the automatic protected idle function 12 assists in locking the capability to translate the vehicle 100 between the park mode 108 and the propulsion mode 106 without the authorized user device 200. Further, the automatic activation of the automatic protected idle function 12 further advantageously assists the user, or responder, to secure the vehicle 100 when in the park mode 108 with the ignition 110 in the ignition-on mode 112*a*.

With further reference to FIGS. 1-3, the user may customize the enablement of the automatic protected idle function 12 via the protected idle system 10 and the various components of the vehicle 100. For example, the user may selectively disable the automatic protected idle function 12 to customize the activation of the automatic protected idle function 12 during the various ignition cycles 114. The protected idle system 10 utilizes a combination of the brake state 122, the control switch state 126, and the hold times 14 to selectively disable and re-enable the automatic protected idle function 12. As generally described herein, an enabled state of the automatic protected idle function 12 is the default state, and the user may customize the degree of automatic activation of the automatic protected idle function 12 by adjusting the enablement during the ignition cycles 114.

In some examples, the user may hold the control switch 124 in the pressed state 126*a* for the first hold time 16. The first hold time 16 is generally associated with the automatic protected idle function 12 being disabled for the active ignition cycle 116. The protected idle system 10, via the ECU 102, may determine whether the brake 120 is in the pressed state 122*a* or the released state 122*b*. The first hold time 16 is generally associated with the control switch 124 being in the pressed state 126*a* and the brake 120 being in the released state 122*b*. Although the state 122 of the brake 120 may be utilized primarily during programming of the first hold time 16, the protected idle system 10 may also determine the state 122 of the brake 120 when disabling the automatic protected idle function 12 in response to the control switch 124 being in the pressed state 126*a* for the first hold time 16 to distinguish from another hold time 14 that may have a similar duration.

In response to the first hold time 16, the ECU 102 disables the automatic protected idle function 12 for the active ignition cycle 116. For example, once disabled, the user may shift the vehicle 100 from the park mode 108 into the propulsion mode 106 and, regardless of the detection of the authorized user device 200, back into the park mode 108 without activating the automatic protected idle function 12. Thus, the ignition 110 remains unlocked for the duration of the active ignition cycle 116 when the automatic protected idle function 12 is disabled using the first hold time 16. The automatic protected idle function 12 is disabled during the active ignition cycle 116 regardless of whether the vehicle 100 is shifted between the park mode 108 and the propulsion mode 106. Thus, the automatic protected idle function 12 is disabled for the duration of the active ignition cycle 116 corresponding to the ignition-on mode 112*a*.

The automatic protected idle function 12 may be re-enabled at the end of the active ignition cycle 116, which is triggered by the ignition-off mode 112*b* of the ignition 110. For example, when the user turns off the vehicle 100 by transitioning the ignition 110 from the ignition-on mode 112*a* to the ignition-off mode 112*b*, the protected idle system 10 resets the automatic protected idle function 12. As a result of the ignition-off mode 112*b*, the future ignition cycles 118 are enabled with the automatic protected idle function 12. The re-enablement of the automatic protected idle function 12 in response to the ignition-off mode 112*b* is generally associated with the disablement of the automatic protected idle function 12 using the first hold time 16 and the pressed state 126*a* of the control switch 124. Thus, the automatic protected idle function 12 will be automatically activated during each future ignition cycle 118 in response to the vehicle 100 being in the park mode 108 and detection of the authorized user device 200.

Referring still to FIGS. 1-3, the user may, in other examples, hold the control switch 124 in the pressed state 126*a* for the second hold time 18. The second hold time 18 is associated with disabling the automatic protected idle function 12 when both the brake 120 and the control switch 124 are in the respective pressed state 122*a*, 126*a*. As mentioned above, the second hold time 18 may be defined by a period of time that is the same as or different from the first hold time 16. The disablement of the automatic protected idle function 12 and the duration of the disablement is determined by the second hold time 18 and the pressed state 122*a*, 126*a* of both the brake 120 and the control switch 124. In this example, the automatic protected idle function 12 is disabled for both the active ignition cycle 116 and each future ignition cycle 118. Thus, regardless of whether the ignition 110 is in the ignition-on mode 112*a* or the ignition-off mode 112*b* and restarted into the ignition-on mode 112*a*, the automatic protected idle function 12 remains disabled.

The user may re-enable the automatic protected idle function 12 using the third hold time 20. For example, the protected idle system 10 may detect via the ECU 102 the authorized user device 200 and the brake 120 in the pressed state 122*a* and further that the control switch 124 is in the pressed state 126*a* for the third hold time 20. If the control switch 124 is held in the pressed state 126*a* for less than the third hold time 20, then the automatic protected idle function 12 remains disabled for all ignition cycles 114. If the control switch 124 is in pressed state 126*a* for the third hold time 20, then the automatic protected idle function 12 is re-enabled by the ECU 102 for all ignition cycles 114, including both the active ignition cycle 116 and each future ignition cycle 116.

Referring now to FIGS. 4-7, an example flow diagram for the protected idle system 10 is depicted. At 400, the vehicle 100 is in the propulsion mode 106 and the automatic protected idle function 12 is enabled but inactive. The ECU 102 determines whether the vehicle 100 has shifted to and out of the park mode 108 and then back to the park mode 108, at 402. If the ECU 102 determines that the vehicle 100 is not in the park mode 108, then the automatic protected idle function 12 remains enabled and inactive. If the ECU 102 determines that the vehicle 100 is in the park mode 108, then the ECU 102, at 404, determines whether the authorized user device 200 is detected. If the authorized user device 200 is not detected, then the automatic protected idle function 12 remains inactive. If the authorized user device 200 is detected, then the ECU 102, at 406, automatically activates the automatic protected idle function 12.

The user may decide to customize the protected idle system 10, which is initiated by the ECU 102, at 408 determining whether the brake 120 is in the pressed state 126*a*. If the brake 120 is in the released state 126*b*, then the ECU 102, at 500, determines whether the control switch 124 is in the pressed state 126*a*. If the control switch 124 is not in the pressed state 126*a*, then the ECU 102 maintains the activation of the automatic protected idle function 12. If the control switch 124 is in the pressed state 126*a*, then the ECU 102 sets, at 502, the first hold time 16. The ECU 102, at 504, determines whether the control switch 124 is pressed for the duration of the first hold time 16. If the control switch 124 is not pressed for the duration of the first hold time 16, then the automatic protected idle function 12, at 506, remains enabled and may remain active and/or inactive when the vehicle 100 is in the propulsion mode 106. If the control switch 124 is pressed for the first hold time 16, then the ECU 102, at 508, disables the automatic protected idle function 12 for the active ignition cycle 116. The ECU 102 monitors the vehicle 100 and determines, at 510, whether the vehicle 100 has been turned off. If the vehicle 100 has not been turned off, then the ECU 102, at 512, maintains the automatic protected idle function 12 as being disabled. If the ECU 102 determines that the vehicle 100 has been turned off, then the ECU 102, at 514, re-enables the automatic protected idle function 12 for future ignition cycles 118.

Returning to step 408, the ECU 102 may determine that the brake 120 is in the pressed state 122*a*. The ECU 102 may then determine, at 600, whether the control switch 124 is also in the pressed state 126*a*. If the ECU 102 determines the control switch 124 is in the released state 126*b*, then the ECU 102, at 602, continues to activate the automatic protected idle function 12 and monitors the states 122, 126 of the brake 120 and the control switch 124. If the ECU 102 determines that the control switch 124 is in the pressed state 126*a*, then the ECU 102 at 604, sets the second hold time 18. The ECU 102 then, at 606, determines whether the control switch 124 is pressed for the duration of the second hold time 18. If the control switch 124 is not pressed for the duration of the second hold time 18, then the automatic protected idle function 12, at 608, remains active. If the control switch 124 is pressed for the duration of the second hold time 18, then the ECU 102, at 610, disables the automatic protected idle function 12 for all ignition cycles 114.

Referring still to FIGS. 4-7, the user may decide to re-enable the automatic protected idle function 12 after disabling the automatic protected idle function 12 for all ignition cycles. The ECU 102, at 612, first determines whether the authorized user device 200 is detected and whether the brake 120 is in the pressed state 122*a*. If the authorized user device is not detected and/or the brake 120 is in the released state 122*b*, then the automatic protected idle function 12 remains disabled. If both the authorized user device 200 is detected and the brake 120 is in the pressed state 122*a*, then the ECU 102, at 614, determines whether the control switch 124 is in the pressed state 126*a*. If the control switch 124 is in the released state 126*b*, then the automatic protected idle function 12 remains disabled. If the control switch 124 is in the pressed state 126, then the ECU 102, at 616, sets the third hold time 20.

Finally, the ECU 102, at 618, determines whether the control switch 124 is pressed for the third hold time 20. If the control switch 124 is not pressed for the third hold time 20, then the automatic protected idle function 12, at 620, remains disabled. If the control switch 124 is in the pressed state 126*a* for the third hold time 20, then the ECU 102, at 622, re-enables and activates the automatic protected idle function 12 for the active ignition cycle 116 and re-enables the automatic protected idle function 12 for each future ignition cycle 118.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described.

The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

detecting a park mode of a vehicle equipped with an automatic protected idle function;

activating the automatic protected idle function automatically in response to the detected park mode;

determining a state of a brake of the vehicle in response to the activated automatic protected idle function;

determining a state of a control switch associated with the automatic protected idle function;

setting a hold time in response to the respective determined state of the brake and the control switch;

disabling the automatic protected idle function for one or more ignition cycles in response to the set hold time; and detecting an ignition-off mode of the vehicle and re-enabling the automatic protected idle function for future ignition cycles in response to the ignition-off mode and detection of an authorized user device.

2. The method of claim 1, wherein setting the hold time includes setting a first hold time, a second hold time, and a third hold time, each hold time associated with a pressed state of the control switch.

3. The method of claim 2, wherein disabling the automatic protected idle function for the one or more ignition cycles includes pressing the control switch for one of the first hold time and the second hold time and disabling an active ignition cycle of the one or more ignition cycles.

4. The method of claim 3, wherein disabling the automatic protected idle function for the one or more ignition cycles includes pressing the control switch for the second hold time and disabling the automatic protected idle function for the active ignition cycle and each of the future ignition cycles of the one or more ignition cycles.

5. The method of claim 3, further including pressing the control switch for the third hold time and re-enabling the automatic protected idle function for each of the future ignition cycles in response to the control switch being in the pressed state for the third hold time.

6. The method of claim 3, wherein disabling the automatic protected idle function for the one or more ignition cycles includes pressing the control switch for the first hold time and disabling the automatic protected idle function for a single ignition cycle corresponding to the active ignition cycle.

7. The method of claim 3, wherein the brake is operable between a pressed state and a released state, the vehicle being configured to disable the automatic protected idle function for the active ignition cycle and each of the future ignition cycles in response to the pressed state of the control switch corresponding to the second hold time and in response to the pressed state of the brake.

8. A computer-implemented method when executed by data processing hardware causes the data processing hardware to perform operations comprising:

detecting a park mode of a vehicle equipped with an automatic protected idle function;

activating the automatic protected idle function automatically in response to the detected park mode;

determining a state of a control switch associated with the automatic protected idle function;

setting a hold time in response to the respective determined state of the control switch;

modifying the automatic protected idle function for one or more ignition cycles in response to the set hold time; and detecting an ignition-off mode of the vehicle and re-enabling the automatic protected idle function for future ignition cycles in response to the ignition-off mode and detection of an authorized user device.

9. The method of claim 8, wherein setting the hold time includes setting a first hold time, a second hold time, and a third hold time, each hold time associated with a pressed state of the control switch.

10. The method of claim 9, wherein modifying the automatic protected idle function for the one or more ignition cycles includes pressing the control switch for one of the first hold time and the second hold time and disabling an active ignition cycle of the one or more ignition cycles.

11. The method of claim 10, wherein modifying the automatic protected idle function for the one or more ignition cycles includes pressing the control switch for the second hold time and disabling the automatic protected idle function for the active ignition cycle and each of the future ignition cycles of the one or more ignition cycles.

12. The method of claim 10, wherein modifying the automatic protected idle function for the one or more ignition cycles includes pressing the control switch for the first hold time and disabling the automatic protected idle function for a single ignition cycle corresponding to the active ignition cycle.

13. The method of claim 10, wherein a brake of the vehicle is operable between a pressed state and a released state, the vehicle being configured to disable the automatic protected idle function for the active ignition cycle and each of the future ignition cycles in response to the pressed state of the control switch corresponding to the second hold time and in response to the pressed state of the brake.

14. The method of claim 9, further including pressing the control switch for the third hold time and re-enabling the automatic protected idle function for each of the future ignition cycles in response to the control switch being in the pressed state for the third hold time.

15. A protected idle system for a vehicle, the protected idle system comprising:

an ignition of the vehicle, the ignition including one or more ignition cycles and further including an ignition-on mode and an ignition-off mode;

a control switch operable between a released state and a pressed state;

an electronic control unit (ECU) communicatively coupled with each of the ignition and the control switch and including data processing hardware configured to automatically activate an automatic protected idle function configured with a first hold time and a second hold time, the ECU configured to disable the automatic protected idle function for at least one of the one or more ignition cycles in response to the pressed state of the control switch corresponding to at least one of the first hold time and the second hold time; and an authorized user device, the ECU configured to re-enable the automatic protected idle function in response to the ignition-off mode of the ignition and detection of the authorized user device.

16. The protected idle system of claim 15, wherein the one or more ignition cycles include an active ignition cycle and future ignition cycles.

17. The protected idle system of claim 16, wherein the automatic protected idle function includes a third hold time, the ECU being configured to re-enable the automatic protected idle function for the active ignition cycle and each of the future ignition cycles in response to the control switch being in the pressed state for the third hold time.

18. The protected idle system of claim 16, further including a brake operable between a pressed state and a released state, the ECU being configured to disable the automatic protected idle function for the active ignition cycle and each of the future ignition cycles in response to the pressed state of the control switch corresponding to the second hold time and in response to the pressed state of the brake.

19. The protected idle system of claim 16, wherein disabling the automatic protected idle function for the one or more ignition cycles includes pressing the control switch for the second hold time and disabling the automatic protected idle function for the active ignition cycle and each of the future ignition cycles of the one or more ignition cycles.

20. The protected idle system of claim 15, wherein the ECU is configured to lock the ignition into a park mode of the vehicle in response to activation of the automatic protected idle function.

* * * * *